April 8, 1958 R. F. ONSRUD 2,829,564
TRACER CONTROL SYSTEM FOR AUTOMATIC MILLING MACHINES
Filed July 5, 1955 2 Sheets-Sheet 1
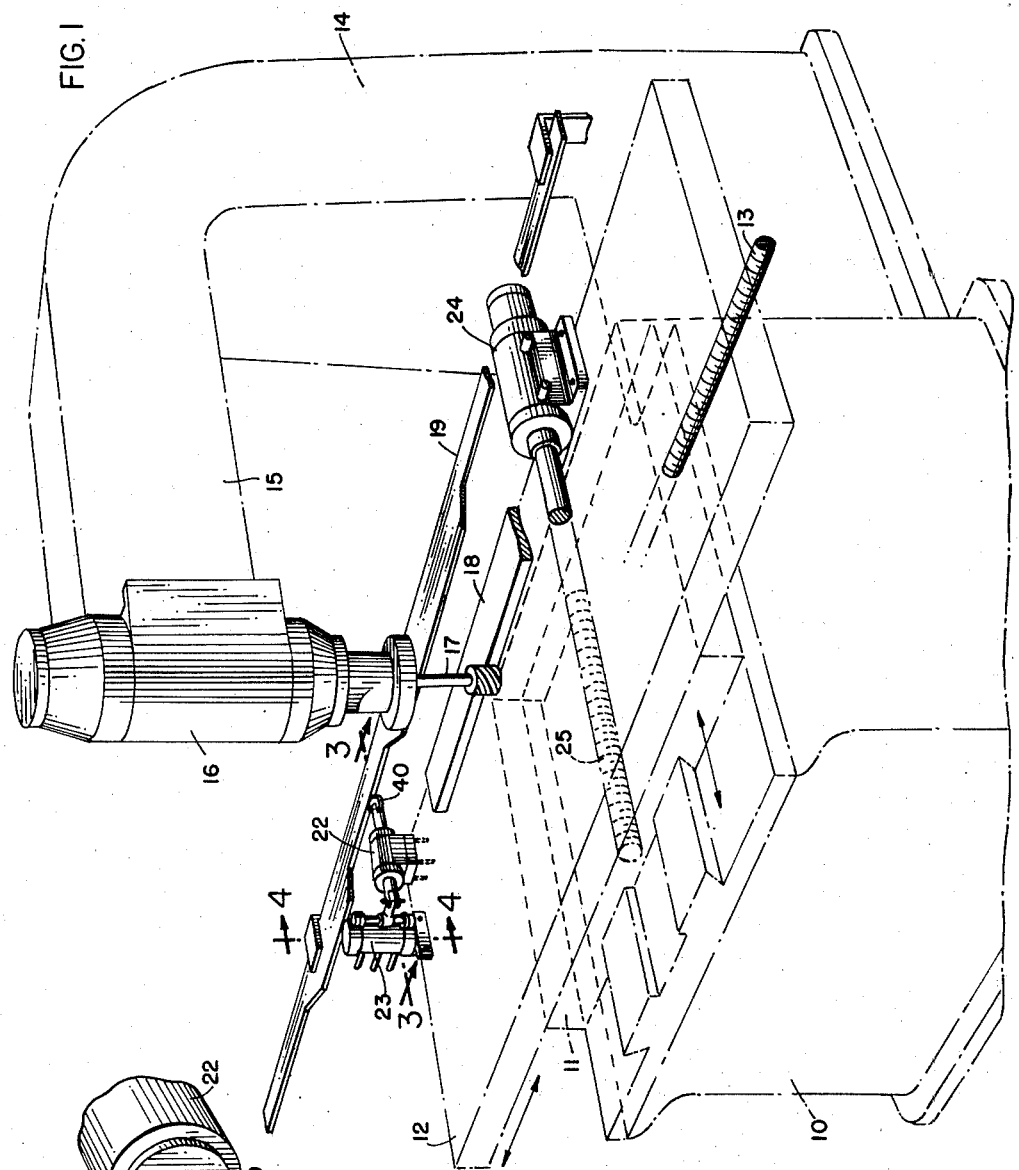
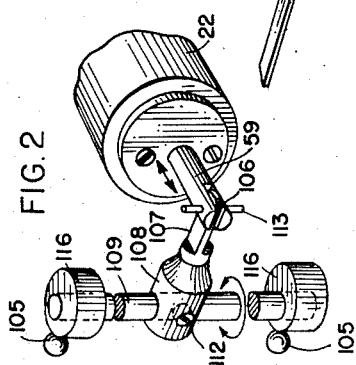
INVENTOR:
RUDOLPH F. ONSRUD
BY
ATT'YS

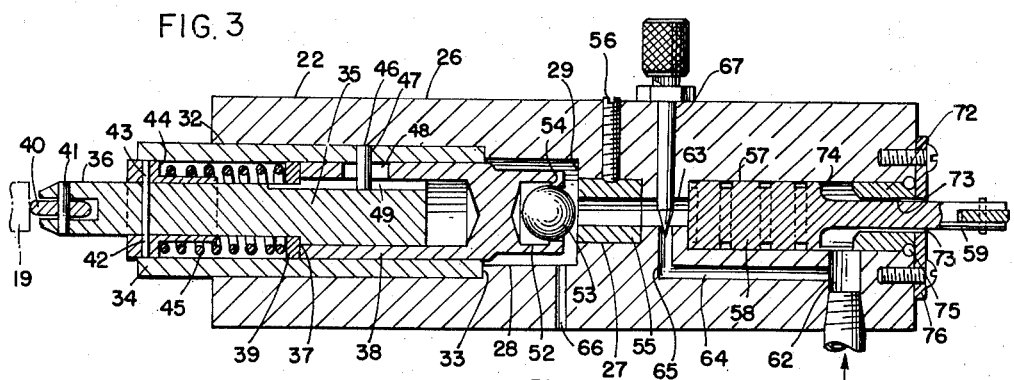

United States Patent Office 2,829,564
Patented Apr. 8, 1958

2,829,564

TRACER CONTROL SYSTEM FOR AUTOMATIC MILLING MACHINES

Rudolph F. Onsrud, Niles, Ill., assignor to Onsrud Machine Works, Inc., Chicago, Ill., a corporation of Illinois Application July 5, 1955, Serial No. 519,969

5 Claims. (Cl. 90—13.5)

This invention relates to positioning control system for automatic milling machines and more particularly to a control system of the tracer type in which relative movement between the cutter head and the work table is afforded in direct response to the contour of a template.

Heretofore, control systems of this type have been devised which afforded movement of the work table with respect to the cutter head, or vice versa, according to the contour of a template but were generally unsatisfactory for the reason that the work product was not a true image of the template because of lag in the operation of the control system. Another reason for the inadequacy of these devices was the inertia of mechanical elements that were employed.

With the foregoing in mind, a principal object of the invention is to provide a control system of the above type which is characterized by instantaneous operation and which is capable of producing a work piece in the exact likeness of the template.

The invention is disclosed herein in conjunction with a milling machine of the type having a stationary cutter head and moving work tables, a longitudinal table moving at a uniform rate, and a transversely moving table operated by the present control system. The present apparatus may be used equally well in a milling machine in which the work table is stationary and the cutter head is movable.

A more particular object of the invention is to provide a control apparatus for milling machines in which a tracer unit senses the contour of the template and actuates a mast control means which regulates the relative speeds of a pair of counter-rotating continuously driven motors which are so connected with the transversely movable element of the milling machine as to propel the same in one direction or the other according to the contour variations of the template.

A further object of this invention is to provide such a control apparatus in which the continuously driven counter-rotating motors are connected through a differential mechanism to a single drive screw arranged to propel the movable element of the milling machine in either direction according to the actuating influence of the tracer unit.

Other and further objects, advantages, and features of the present invention will be apparent to those skilled in the art from the following description, taken in conjunction with the accompanying drawings showing a specific embodiment of the invention in which similar reference characters relate to similar parts and in which:

Figure 1 is a view in perspective showing a milling machine of the moving table type equipped with a control apparatus operable in accordance with the present invention;

Fig. 2 is a greatly enlarged fragmentary perspective view of a detail of the control apparatus shown in Fig. 1;

Fig. 3 is a greatly enlarged elevational sectional view taken substantially on line 3—3 of Fig. 1;

Fig. 4 is a greatly enlarged vertical sectional view taken substantially on line 4—4 of Fig. 1; and Fig. 5 is an elevational view, party in section and partly diagrammatic showing details of a milling machine control apparatus according to the present invention.

With reference to the drawings and more particularly to Fig. 1 the present invention is shown in conjunction with a milling machine having a bed 10 on which is mounted for transverse sliding movement a table 11. The confronting faces of the bed and the table are dovetailed or otherwise suitably formed to provide tracks or slideways for this movement. Superimposed upon the table 11 is a table 12 which is moved longitudinally at a constant rate of speed by means of a screw 13 actuated by a suitable source of power. Connected to the bed 10 is a standard 14 which is provided with a projecting arm 15 extending over the tables 11 and 12. At the free end of the arm 15 is provided a cutter head 16 having a cutter 17 which is rotated by a motor contained within the cutter head 16 to mill a work piece 18 to any desired configuration. A template 19 is mounted on suitable stationary support means in spaced relation to the top surface of the movable table 12.

According to the present invention, means are provided for controlling the transverse movement of the table 11 so that the work piece is milled to the configuration of any selected template as the work is carried in the longitudinal direction by the table 12. In this instance, the particular means shown takes the form of a pneumatic tracer unit 22 which follows the contour of the template and controls the operation of a master control valve 23, which in turn effects the supply of actuating fluid to a fluid power unit 24, which, as will be hereafter apparent, contains two separate counterrotating fluid motors for rotating a screw 25 to propel the table 11 to the left or right, as viewed in Fig. 1, depending upon the profile of the template. In the form shown the entire control system is air operated and the motors are illustrated as air turbine wheels. It will be understood, however, that any suitable motor means may be employed; for example hydraulic or electric or a combination of electric and air or hydraulic, and any suitable tracer means adapted to control such motors may be used to obtain the milling machine operation according to the present invention.

Referring now to Fig. 3 the pneumatic tracer unit 22 herein shown comprises a casing 26 provided at one end with an axial bore 27, a counter-bore 28 communicating with the bore 27 and forming a shoulder 29, and another counter-bore 32 communicating with the bores 27 and 28 and forming a shoulder 33. Fixedly mounted within the bore 32 and abutting the shoulder 33 is a sleeve liner 34 in which is slidably mounted a plunger 35. The plunger 35 is recessed to form an end portion 36 of reduced diameter and a shoulder 37. The free end of the end portion 36 is formed with a longitudinally extending slot in which a follower 40 is rotatably mounted on an axle 41. Mounted within the sleeve 34 in surrounding relation to the plunger 35 and extending into the bore 28 is a hollow piston 38. Around the end portion 36 and abutting the shoulder 37 and the left annular edge of the piston 38 as viewed in Fig. 3, is a ring 39. A retainer bushing 42 is fixedly secured in surrounding relation to the end portion 36 by means of a diametrically extending pin 43. The bushing 42 is stepped to form an annular flange 44. Arranged in abutting relation to the flange 44 and the ring 39 is a spring 45 which is normally compressed by the plunger 35 and acts to urge the piston 38 to the right, or the plunger 35 to the left as the case may be. Sliding movement of the piston 38 with respect to the sleeve 34 is limited by a pin 46 which is fixedly mounted at one end in a radial opening 47 in the sleeve 34. This pin 46 passes through a longitudinally extending elongated slot 48 in the sidewall of the piston 38 and also prevents rotation of the piston 38 with respect to the sleeve 34. The inner end of the pin 46 is received in a longitudinally extending groove 49 in the surface of the plunger 35 to prevent rotation of the plunger. The plunger 35 is normally in a medial position in the liner 34 as shown in Fig. 3 and is movable to the left or right, as viewed in that figure, for a purpose hereafter described.

At the right end of the piston 38 is formed a recess 52 in which is mounted a ball check 53. This ball check 53 is retained in position by an integrally formed inwardly extending flange 54. A collar 55 is mounted in the bore 27 to provide a seat for the ball check 53. The collar 55 is retained in position by a set screw 56. Since the piston 38 is urged toward the collar 55 by the spring 45 a resilient engagement of the ball check 53 with the seat 55 is effected.

At the opposite end of the casing 22 is formed a bore 57 in which is slidably mounted a second or floating plunger 58. Integrally formed with the plunger 58 is a control rod 59, the purpose of which will be hereafter described.

The plunger 58 is movable within the bore 57 by control air supplied from a suitable source and introduced into the casing 22 through a radial opening 62 communicating with the bore 57. A passage is provided within the casing 22 for exhausting the fluid when the ball check 53 is in the open position shown in Fig. 3. This passage including an axial bore 63 joining the bore 28 and the bore 57, a longitudinally extending bore 64 communicating at one end with the opening 62 and at the other end with a radial opening 65 which opens into the bore 63, and a radial discharge opening 66 providing communication between the bore 28 and the atmosphere. For regulating the rate of air flow through this passage a needle valve 67 is arranged at the mouth of the opening 65. The passage thus formed is open to atmosphere when the piston 38 and the ball check 53 are withdrawn from the seat 55, or are in the position shown.

As the plunger 35 and the piston 38 are moved to the right, in response to variation of the profile of the template 19, the ball check 53 is seated in engagement with the collar 55 and the opening 65 is thus cut off from the discharge passage 66. As a result, sufficient pressure is built up in the bore 63 to move the second plunger 58 and the shaft 59 to the right, as viewed in Fig. 3, for a purpose hereafter described. For limiting this movement to the right, an annular stop 72 is mounted within the bore 57 adjacent its outer end. The stop 72 has a central opening 73 of a diameter slightly exceeding the diameter of the shaft 59 to provide a limited bleed for air in the bore 57. The shaft 59 being joined to the plunger 58 forms a shoulder 74 of limited area as compared to the end face of the plunger. When the ball check 53 is in the open position, as shown, pressure of the fluid on the shoulder 74, modified by the bleed provided by the opening 73 and balanced by the bleed through the passage 66 is sufficient to retain the plunger 58 in a retracted or medial position. Sealing of the right end of the casing against loss of pressure other than by the bleed 73 is afforded by a sealing ring 75 held in position by an end plate 76.

In Fig. 4 is shown the master control valve 23 for affording selective feeding of working fluid to the motors. The valve 23 includes a casing 78 having an axial bore 79 communicating at each end with a counter-bore 82 and forming a pair of substantially frustoconical seats 80 which join the bore surfaces. Both ends of the casing structure are identical and for the sake of simplicity only one end will be described in detail, it being understood that the other end is the same. End caps 83 are secured to the ends of the casing 78 by means of screws 84. Each of the end caps 83 has a bore 85 opening into a threaded counter-bore 86 in which is threadedly received a plug 87 which has an axial bore 88 adjoining a bore 89 of substantially greater diameter. The outer edges of the plug 87 are chamfered at 92 to afford a seat for a purpose hereafter described. Mounted for sliding movement within each of the bores 82, is a hollow piston 93 which has at its inner end a substantially frusto-conical face 94 which in the position shown in the right hand bore of Fig. 4 engages the seat 80. Extending from the face 94 is a section 95 which protrudes into the bore 79. The section 95 is formed with castellations 96 and an opening 97 for a purpose hereafter described. Within the piston 93 is formed a substantially frusto-conical face 91 for engaging with the seat 92 on the plug 87 when the piston is moved to its open limit position.

Opening into the bore 79 is a threaded radial aperture 98 through which primary air from a suitable source is introduced. The air thus admitted passes through the opening 97 and exerts a pressure on the inner face 91 of the piston 93 sufficient to retain the piston in the closed position shown on the right hand side of Fig. 4. A compression spring 99, seated within the bore 89 of the plug 87, cooperates with this air in seating the piston. The invention contemplates the provision of a discharge outlet 102 for each bore 82 to afford feeding of primary fluid to the fluid motors according to the positions of the several pistons 93. These discharge outlets form, in conjunction with the inlet 98, two distinct passages through the master valve.

The invention also contemplates the provision of means for normally exhausting the air within the bores 82 to cause movement of the pistons 93 to their outer or open position, in engagement with the face 92 of the associated plug 87, to uncover the respective outlets 102, and thus open these passages. In this connection, a radial opening 103 is formed in each of the end plates 94 to provide a bleed connection between the bores 85 and the atmosphere. At the outer end of each of the openings 103 is formed a seat 104 for a ball check 105 which is operable to close the opening 103 for causing a build-up of air pressure within the respective bores 82 sufficient to hold the pistons 93 closed. The ball checks 105 are normally unseated by the air pressure in the openings 103 and are depressed inwardly selectively to close the openings 103 in response to the movement of the shaft 59 of the valve 22.

Referring now to Fig. 2, the outer end of the shaft 59 is provided with an elongated slot 106 in which is received a tongue 107 of an actuating element or crank arm 108 which is fixedly secured to a rotatable shaft 109 by means of a set screw 112. The tongue 107 is pivotable about a pin 113 which extends substantially perpendicularly to the outer end of the shaft 59. The shaft 109 is rotatably mounted on lugs 114 which are integrally formed with the end plates 83. Adjustably mounted on the shaft 109 by means of set screws 115 are a pair of oppositely acting cams 116 which are phased selectively to depress one or the other of the ball checks 105 upon turning of the shaft 109 to close one of the openings 103, and thus cause movement of its associated piston 93 to its closed position. The invention contemplates the use of means other than cams 116 for effecting this result. For instance, radially extending actuating arms may be fixedly mounted on the shaft 109 to depress the ball checks 105 selectively.

In operation, the follower 40 is arranged in rolling engagement with the profile of the template 19, and as the profile of the template changes the plunger 35 is moved inwardly or outwardly of the casing 26 to further compress or relieve the spring 45 and thus effect movement of the piston 38.

Assuming that the piston 38 is moved to the right, as viewed in Fig. 3, the ball check 53 is seated on the collar 55 to close the passage to the bleed 66 and air pressure is built up within the bore 63 to urge the plunger 58 and the shaft 59 to the right. As the shaft 59 is urged to the right the element 108, which is pivotally connected to the free end of the shaft 59, effects partial rotation of the shaft 109 and thus an appropriate one of the cams 116 is brought into engagement with its respective ball check 105 to close the respective one of the bores 82 and effect movement of the respective piston 93 to its inner or closed position, thus covering the respective discharge outlet 102.

This results in primary pressure fluid being cut off from one of the fluid motors comprising the power unit 24 whereby the opposite motor will operate to turn the screw shaft 25 in the appropriate direction to move the table 11 laterally away from the template 19 until the follower 40 and the plunger 35 shift to the left in the casing 26 sufficiently to allow the air pressure in the bore 63 to unseat the ball check 53 from the collar 55 and return the piston 38 to a normal, floating intermediate condition. As this occurs, the drop in pressure in the bore 63, resulting from opening the passage to the bleed 66, permits the plunger 58 to shift to an intermediate position in the bore 57 and thereby rock the shaft 109 sufficiently to permit both of the bleed checks 105 of the master valve 23 to be open so that primary pressure fluid will be supplied equally to the two motors of the power unit 24.

Normally the piston 38 "hunts" between open and closed positions relative to the collar or seat 55, and the plunger 58 likewise shifts between extreme right and left positions, so that the pistons 93 of the master valve 23 continuously operate to open and close the respective discharge outlets 102 and thereby maintain a balance of fluid pressure supply to the two motors of the power unit 24. Thus the two motor units will operate at substantially the same speed and the rotation of the screw shaft 25 in either direction will be substantially negligible, and any movement imparted to the table 11 during such "hunting" action will be extremely small.

When the piston 38 moves to the left, as viewed in Fig. 3, as when the follower 40 enters a depression in the profile of the template 19 and the plunger 35 releases the tension on the normally compressed spring 45, the piston 38 holds an open relation with respect to the seat 55 whereby the plunger 58 moves to the extreme left hand position, as shown in Fig. 3, and the rock shaft 109 is turned to close the bleed passage of the master valve 23 opposite the one previously described. This results in the screw shaft turning in the direction to move the work table 11 toward the template 19 until the plunger 35 has been pushed back into the casing 22 to an intermediate position at which the normal "hunting" action of the piston 38 will govern operation of the power unit 24 to maintain the table 11 in proper relation to the profile line of the template.

For maintaining the air passages 97 through the pistons 93 of the master valve 23 clean a pair of needles 117 are threadedly mounted in apertures 118 which are coaxial with the plug bores 88 and the passages 97. The passages for air through the passages 97 and plug bores 88 are thus annular in configuration and the passage around the needles in the bores 88 is considerably restricted. The cams 116 are opposite each to the other in phase so that but one is operative at any one time. The relative positions of these cams, however, may be adjusted to control the sensitivity of the tracer unit 22. The castellations 90 provide a selectively large surface area as compared to the area of the seat 91. As a result, when the pressure fluid is relieved in the bore 82, by opening a respective one of the bleed outlets 103—104, the force on the faces of the castellations 90 is sufficient to overcome the force of the springs 99 and allow the pistons 93 to move so as to open the respective discharge passages 102.

In Fig. 5 is shown diagrammatically the power unit 24 in operative relation to the screw 25 which affords lateral movement of the table 11. The unit 24 includes a fluid motor 119 rotatably mounted on a shaft 122. Secured to the outer end of the shaft 122 is a fluid motor 123 which normally rotates with the shaft 122 in a direction opposite to the direction of the motor 119. Fixedly mounted to the opposite end of the shaft 122 is an oblique ring gear 124 which forms a part of a differential assembly 120. The motor 119 is provided with a hub 125 formed with a similar oblique ring gear 126. On the free end of the screw 25 is fixedly mounted a yoke 127 having arms 128. Rotatably mounted in each of the arms 128 is a stub shaft 129 having at its inner end a bevel gear 132 in meshing engagement with the ring gears 124 and 126. By this arrangement, the yoke 127 and the screw 25, will remain immobile so long as the speed of the motors 119 and 123 is equal. When, however, the supply of actuating air fed to one of the motors is reduced by the operation of the master valve in response to the movement of the tracer unit 22 a speed differential is brought about which effects rotation of the yoke 127 and the screw 25 in one direction or the other depending upon which motor speed is greater. For instance, assuming clockwise rotation of the motor 123, as viewed from the left in Fig. 5, the shaft 122, being affixed to the motor 123 rotates in the same direction, as will the ring gear 124. The uppermost of the bevel gears 122 rotates in a clockwise direction, as viewed from the top in that figure, while the lowermost of the bevel gears 122 will rotate oppositely. The hub 125 of course rotates counter-clockwise. It will be apparent that an increase in speed of either of the motors effects rotation of the yoke 127 and the screw 25.

As above described invention provides a power system for an automatic milling machine in which the work table is moved substantially instantaneously with respect to a cutter head in response to the profile variations of a template. The invention may also be employed with advantage in machines in which the work table is stationary and the cutter head movable. The continuously operating and differentially opposed motors employed provide a constantly acting power source that is instantly responsive to any variations of the driving force with a kind of reflex action. Thus, when the movement of the table in one direction or the other is indicated the full operating speed power of the respective motor is instantly active for use with the full force of its inertia as well as the motive power because of the fact that the rotation of the screw 25 depends entirely upon a differential in the speed between the two motors. The function of the tracer unit, therefore, is to initiate the reflex power action of one motor or the other according to the contour change of the template, this resulting from speed variation only which causes the operating load to be applied instantly to the appropriate motor.

It will now be apparent that the objects of this invention may be realized by other power means, and appropriate control means therefore, than the specific pneumatic system herein illustrated and described. Also, it will be understood that power shift from one motor unit to the other, in either direction, may be had by speed variation or control of but one of the motor units and where the other motor unit is a constant speed constant torque device.

Although but one specific embodiment of this invention is herein shown and described it will be understood that numerous details of the apparatus and construction shown may be altered or omitted without departing from the spirit of this invention as defined by the following claims.

I claim:

1. A positioning control system for automatic milling machines having a cutter head and a work table relatively movable with respect to each other comprising a tracer unit having a casing, a follower, a spring for urging said follower into continuous engagement with the profile of a template, said follower being connected to a plunger movable axially in said casing, a passage formed in said casing for secondary pressure fluid, said plunger being operative upon actuation selectively to open and close said passage, other plunger means in said tracer unit operated by said secondary fluid upon opening and closing said passage for operating a master valve, a master valve having a casing including an inlet for reception of primary pressure fluid and a pair of normally open discharge passages, means in said master valve for selectively closing said discharge passages, said tracer unit having means associated therewith operative upon actuation selectively to close one of the said master valve passages while permitting the other of said master valve passages to remain open, a first fluid motor, a second fluid motor adapted to rotate in a direction opposite to that of the said first motor, said motors being operative by primary fluid from said passages to afford relative movement of the cutter and the work table when one of said motors is rotated substantially faster than the other, a drive means for effecting relative movement of said cutter and work table, and differential means for connecting said fluid motors to said drive means continuously.

2. Positioning apparatus for an automatic milling machine having a relatively movable cutter and work table, comprising a pair of coaxially mounted contra-rotating fluid driven motors, a master valve for affording selective variation of the speed of said motors, said master valve having an inlet for the introduction of primary fluid under pressure and independent normally open passages to discharge outlets connected to respective motors, a pair of pistons in said master valve each independently movable to open and close one of said discharge outlets, said master valve having a pair of normally open bleed passages each controlling the movement of a respective piston, means responsive to the profile of a template for selectively closing one or the other of said bleed passages alternatively to effect the flow of the primary fluid to the respective one of said motors, and a differential assembly operatively connected to said motors and to a common drive means whereby relative movement of the cutter and the work table is afforded when the speed of one of said motors is greater than the speed of the other of said motors.

3. An automatic milling machine comprising, in combination, a stationary cutter, a work table movable toward and away from said cutter, means for positioning said work table in response to variations of the profile contour of a template, said means including a power unit, said power unit comprising a pair of coaxially mounted contrarotating fluid motors and a differential assembly operatively connected thereto, means driven by said differential assembly for moving said work table, means for effecting selective speed variation of said motors, last named means including a tracer unit having a pair of cam elements, a master valve having an inlet for the introduction of primary pressure fluid and a pair of discharge passages for the flow of working fluid to the respective motors, a pair of bleed passages, a pair of pistons and a pair of ball check valves for said bleed passages, said passages being normally open and adapted to be selectively and alternatively closed by said tracer unit and said cam elements to close one of said ball check valves and actuate one of said pistons into closing relation with one of said discharge passages to control the flow of fluid to one or the other of said motors as required, whereby said work table is moved when the speed of one of said motors is different than the speed of the other of said motors.

4. In an automatic milling machine having a relatively movable cutter and work table, a pair of coaxially mounted contra-rotating fluid motors, a differential assembly connected to said motors, a drive shaft operated by said differential assembly for effecting relative movement of said cutter and work table, and means for effecting selective variation of the speed of said motors in response to variations of the profile contour of a template, said means including a master valve having an inlet port for primary pressure fluid and a pair of normally open primary fluid passages leading to respective discharge outlets connected to supply said fluid to the respective motors, said master valve having a normally open bleed passage and a piston means controlled thereby for each of said primary fluid passages, said pistons being independently operable to close the respective primary fluid passages, and a tracer unit for engaging the profile of the template and operative to selectively and alternatively close said bleed passages and actuate said piston means to close said master valve passages for varying the primary fluid supply to one or the other of said motors as required, whereby the operation and direction of rotation of said drive shaft is responsive to the difference in speed of the motors at any particular instance.

5. An automatic milling machine comprising, in combination, a work table element, a cutter element, one of said elements being movable toward and away from the other, a pair of coaxially mounted contra-rotating fluid motors, a differential assembly connected to said motors, a drive shaft operable by said differential assembly for effecting movement of said one element, and means for effecting selective speed variation of said motors in response to changes of the profile contour of a template, said means including a master valve having an inlet port for primary pressure fluid, and a pair of normally open primary fluid passages leading to respective discharge outlets connected to supply said fluid to the respective motors, said master valve having a normally open bleed passage and a piston controlled thereby for each of said primary fluid passages said pistons being independently operable to close the respective primary fluid passages, and a tracer unit for engaging the profile of the template and having cam means operative to selectively close said bleed passages and operate the respective pistons for varying the primary fluid supply to one or the other of said motors as required, whereby the operation of said drive shaft and the direction of movement of said one element is responsive to the relative speeds of the motors at a particular instance.

References Cited in the file of this patent
UNITED STATES PATENTS

| | | |
|---|---|---|
| 2,101,712 | Johansen | Dec. 7, 1937 |
| 2,116,593 | Bouvier et al. | May 10, 1938 |
| 2,380,357 | Ziebolz | July 10, 1945 |
| 2,516,495 | Waterson | July 25, 1950 |
| 2,536,965 | Taylor | Jan. 2, 1951 |
| 2,778,280 | Trofimov | Jan. 22, 1957 |